United States Patent [19]

Inoue et al.

[11] Patent Number: 4,665,764
[45] Date of Patent: May 19, 1987

[54] ROTARY ACTUATOR

[75] Inventors: Masaru Inoue; Masao Ida, both of Kanagawa; Takao Kohara, Tokyo, all of Japan

[73] Assignees: Jidosha Denki Kogyo Kabushiki Kaisha, Yokohama; Tokico Ltd., Kawasaki, both of Japan

[21] Appl. No.: 782,266

[22] Filed: Sep. 30, 1985

[30] Foreign Application Priority Data

Oct. 4, 1984 [JP] Japan .................... 59-150434[U]

[51] Int. Cl.$^4$ ............................................. F16H 27/04
[52] U.S. Cl. .................................... 74/436; 74/84 R; 188/319; 188/299
[58] Field of Search ............... 74/436, 84 R; 188/319, 188/299

[56] References Cited

U.S. PATENT DOCUMENTS 3,478,616 11/1969 Smith ..................................... 74/436
3,546,958 12/1970 Parks ..................................... 74/436
3,855,873 12/1974 Fletcher et al. ...................... 74/436
4,579,199 4/1986 Nakayama ........................ 74/436 X Primary Examiner—Cornelius J. Husar
Assistant Examiner—Joseph A. Fischetti
Attorney, Agent, or Firm—Wenderoth, Lind & Ponack

[57] ABSTRACT

A rotary actuator has a Geneva wheel having in one end surface thereof an annular central recess and a plurality of angularly equally spaced and radially extending grooves connected to the central recess, a driving rotor connected to a rotary driving source and rotatable around an axis eccentric with respect to the Geneva wheel, a driving pin mounted on the driving rotor and engaging selectively with one of the grooves and the central recess in the Geneva wheel, an arcuate wall defined on a part of the circumferential wall of the driving rotor, and a plurality of correspondingly shaped arcuate walls formed on the Geneva wheel and cooperating with the arcuate wall of the driving rotor when the driving pin of the driving rotor engages with the central recess thereby preventing the rotation of the Geneva wheel with respect to the driving rotor.

4 Claims, 7 Drawing Figures

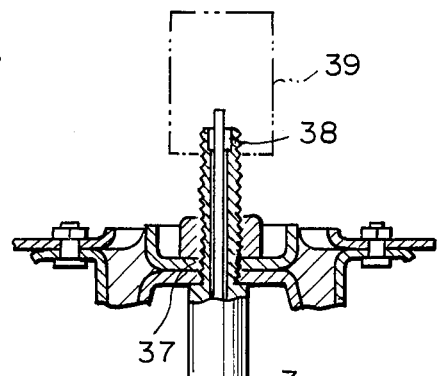
Fig. 6
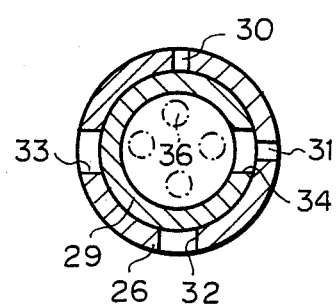
Fig. 7
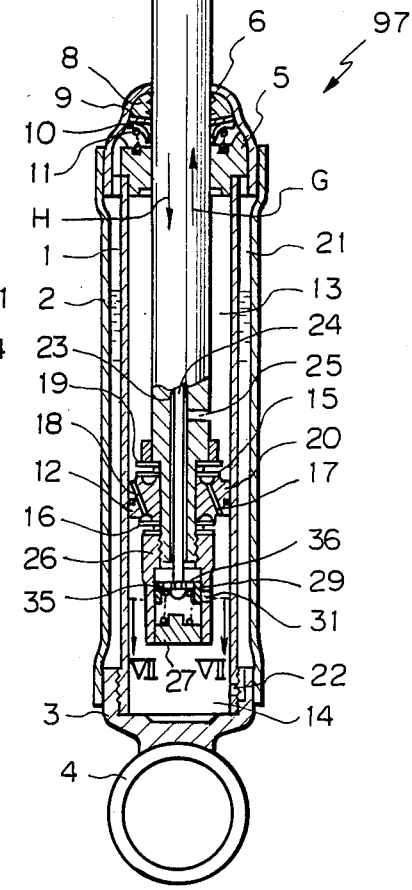

ROTARY ACTUATOR

BACKGROUND OF THE INVENTION

This invention relates to a rotary actuator and, particularly to a rotary actuator adapted for use as a device for driving an adjusting mechanism of a hydraulic damper of the adjustable damping force type.

A hydraulic damper of the adjustable damping force type is widely used in a vehicle such as an automobile so that the damping force of the hydraulic damper can be adjusted in response to the condition of the road and to operating conditions of the vehicle. The mechanism for adjusting the damping force usually comprises a rotatable adjusting member for adjusting the opening of a liquid passage in the damper and a device for driving the adjusting member. Conventionally, a reciprocatingly movable solenoid connected to a rack-pinion device, a geared motor or the like have been utilized as the driving device for attaining high accuracy in locating the adjusting member. Recently, it has been found desirable to reduce the size for improving the mounting characteristics and to increase the operating speed. However, the reciprocatively movable solenoid or the geared motor of prior art cannot satisfy the aforesaid desiderata since it is difficult to reduce the size of the motion conversion mechanism or the speed reduction mechanism utilized with the solenoid or the motor and the control circuit necessary for attaining the desired accuracy is complicated.

SUMMARY OF THE INVENTION

This invention has been made to overcome the foregoing drawbacks and aims to provide a rotary actuator particularly adapted for use with a hydraulic damper of the adjustable damping force type which can be selectively located at a plurality of angular positions with a high accuracy by a simple control circuit.

According to the invention, there is provided a rotary actuator comprising a first rotor having in one end surface thereof an annular central recess and a plurality of engaging grooves connected with and extending radially outwardly from the central recess, the first rotor being rotatable around a first axis which extends vertically relative to the end surface of the first rotor, a second rotor rotatable around a second axis which is parallel to and spaced from the first axis, the second rotor having a projection thereon to selectively engage with the central recess and the engaging grooves whereby rotation is transmitted from the second rotor to the first rotor when the projection engages with either one of the engaging grooves and is not transmitted from the second rotor to the first rotor when the projection is located in the central recess, and a driving mechanism connected with the second rotor to rotate the same around the second axis.

BRIEF DESCRIPTION OF THE DRAWINGS

Further objects and advantages of the invention will become apparent from the following detailed description taken with reference to the accompanying drawings, in which:

FIG. 6 is a sectional view of a hydraulic damper with which the rotary actuator of FIG. 1; is adapted to be used and FIG. 7 is a sectional view taken along line VII—VII in FIG. 6.

DETAILED DESCRIPTION OF THE PREFERRED EMBODIMENTS

Figure 1:
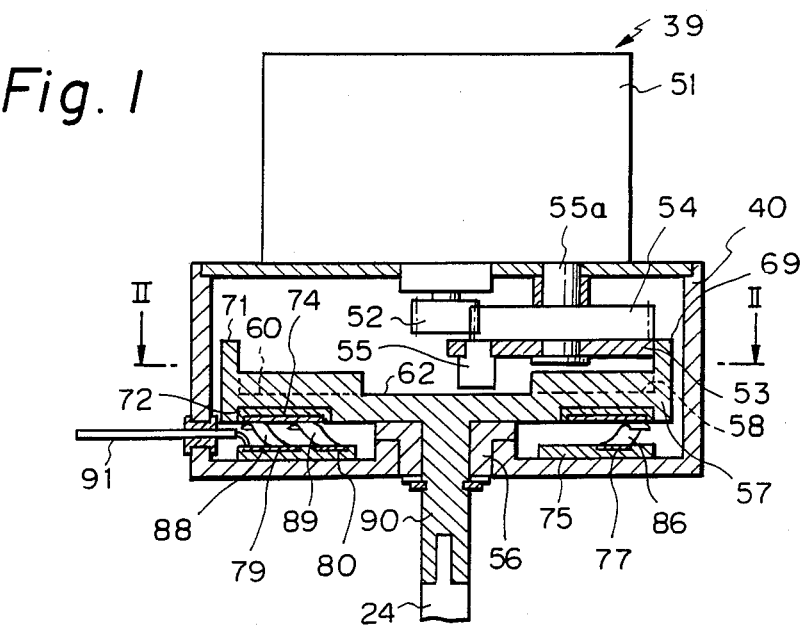
FIG. 1 is a sectional view of a rotary actuator according to a preferred embodiment of the invention.

FIGS. 6 and 7 show one example of a hydraulic damper 97 of the adjustable damping force type with which the rotary actuator according to the invention is adapted to be used. The hydraulic damper 97 comprises an inner tube 1 acting as a cylinder, a co-axial outer tube 2 surrounding the inner tube 1, a cap 3 secured to one ends of the inner and outer tubes 1 and 2, and a mounting ring 4 integrally connected to the cap 3 for mounting the hydraulic damper 97 on a part such as a wheel axle or the like of a vehicle. A rod guide 5 and a cap 6 are respectively fitted on the other ends of the inner and outer tubes 1 and 2. A piston rod 7 extends through the rod guide 5 and the cap 6. An annular packing 8 is disposed on the inner side of the cap 6 and engages sealingly and slidably with the piston rod 7. A retainer 9, an annular check valve 10 and a spring 11 are disposed between the packing 8 and the rod guide 5 and surround the piston rod 7. The check valve 10 cooperates with the rod guide 5 to permit the fluid flow only in the radially outward direction.

A piston 12 is secured to the inner end of the piston rod 7 and partitions the interior of the inner tube 1 into two liquid chambers 13 and 14. Annular disc valves 15 and 16 are mounted on the opposite sides of the piston 12 to cooperate respectively with passages 17 and 18 which extend respectively through the piston 12. The disc valves 15 and 16 are normally closed and open respectively with the downward and upward movement of the piston 12, or act as one way valves respectively. To communicate liquid chambers 13 and 14 permanently, there is provided a fixed orifice branched from each of passages 17 and 18. Shown at 19 and 20 in FIG. 6 are a washer and a piston ring respectively.

The disc valve 15 opens when the pressure in the chamber 14 is higher than the pressure in the chamber 13 by a predetermined level, and permits the liquid flow from the chamber 14 to the chamber 13 through the passage 17. The valve 15 closes when the pressure difference between the chambers 14 and 13 is decreased below the predetermined level to prevent the liquid flow from the chamber 14 to the chamber 13 through the passage 17. The valve 16 opens only when the pressure difference between chambers 13 and 14 is larger than a predetermined level.

An annular chamber 21 defined between the inner tube 1 and the outer tube 2 is permanently communicated with the chamber 14 through an opening 22 which is formed in the lower end portion of the inner tube 1. The chambers 13 and 14 and the lower portion of the chamber 21 have therein hydraulic liquid, and the chamber 21 has in the upper portion thereof pressurized gas such as inert gas.

A through bore 23 is formed coaxially in the piston rod 7, and a shaft 24 rotatably extends through the bore 23. The diameters of the bore 23 and the shaft 24 are such as to define an annular space therebetween which acts as a liquid passage as will be explained hereinafter. A radial hole 25 is formed in the piston rod 7 to communicate the liquid chamber 13 with the bore 23.

A tubular member 26 is screw-threadingly connected to the lower end of the piston rod 7 to act as a nut connecting the piston rod 7 with the piston 12, the disc valves 15 and 16, and related parts. A cap 27 is secured to the lower end of the tubular member 26.

A shutter 29 acting as an opening adjusting member is secured to the lower end of the shaft 24. As shown in FIG. 7, there are formed in the peripheral wall of the tubular member 26 radial holes 30, 31, 32 and 33 of different diameters. A radial hole or cutout 34 is formed in the peripheral wall of the shutter 29, whereby, when the shutter 29 is rotated in the tubular member 26, radial holes 30, 31, 32 and 33 are selectively opened or closed by the hole or cutout 34 in the shutter 29. The radial holes 30, 31, 32 and 33 are spaced from each other by 90 degrees, and the diameters of the radial holes are decreased sequentially in the order of holes 33, 32, 31 and 30. The hole or cutout 34 is larger than the largest radial hole 33. A spring 35 is disposed between the cap 27 and the shutter 29 to bias the shutter 29 in the upward direction. Axial holes 36 are formed in the shutter 29 and, the effective passage area of radial holes 36 is larger than that of the hole 33. Thus, the radial hole 25, annular space between the bore 23 and the shaft 24, axial holes 36, the hole or cutout 34, and the selected one of radial holes 30, 31, 32 and 33 constitute a liquid passage connecting liquid chambers 13 and 14.

The upper end of the shaft 24 which sealingly extends through the bore 23 through a seal ring 38 is connected to a rotary actuator 39 according to the invention as described hereinafter with reference to FIGS. 1-5. A casing 40 of the rotary actuator 39 is mounted on the upper end of the piston rod 7. A D.C. motor 51 is mounted on the casing 40. A pinion 52 is secured to the output shaft of the motor 51 and meshes with a gear 54 to which is fixedly secured a pin wheel 53, the pinion 52 and the gear 54 constituting a reduction gear mechanism. The motor 51, the pinion 52 and the gear 54 constitute a driving mechanism according to the invention. The pin wheel 53 has a generally fan shaped configuration as shown in chain lines in FIG. 2 and is rotatable with gear 54 around a shaft 55a which is secured to or journalled on the casing 40. A driving pin 55 is mounted on the pin wheel 53. A Geneva wheel 57 is rotatably mounted on the casing 40 in a bearing 56 and has in one end surface thereof a circular central recess 62 and four radially extending grooves 58, 59, 60 and 61 which are equally spaced by 90 degrees and are connected respectively with the central recess 62, as clearly shown in FIG. 2. These grooves cooperate with the driving pin 55 of the pin wheel 53 as explained hereinafter. The pin wheel 53 has an arcuate end surface 63, and the Geneva wheel 57 has arcuate walls 64, 65, 66 and 67 on projections 68, 69, 70 and 71 respectively which are equally spaced in the circumferential direction and are provided respectively between grooves 58, 59, 60 and 61 respectively. The configuration of respective arcuate walls 64, 65, 66 and 67 correspond to arcuate end surface 63 of the pin wheel 53.

Figure 4:
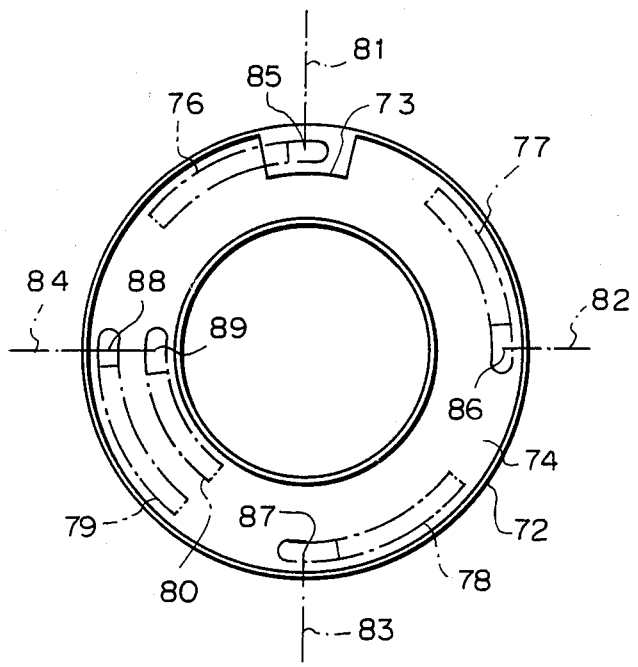
FIG. 4 is an explanatory view showing the relationship between brushes and slip rings shown in FIG. 1.

A slip ring 74 formed of an annular thin metal plate and having a cutout 73 is mounted on the other end surface of the Geneva wheel 57 opposite to aforesaid end surface having grooves 58-62. An annular electrically insulating member 72 is interposed between the slip ring 74 and the Geneva wheel 57. There are provided on the inner surface of the casing 40 opposing the slip ring 74 on the Geneva wheel 57 annular electrically insulating member 75 and arcuate electrically conductive plates 76, 77, 78, 79 and 80 as shown in FIGS. 1 and 4. The plates 76, 77, 78 and 79 are circumferentially aligned with respect to the rotational direction of the slip ring 74. Brushes 85, 86, 87, 88 and 89 are respectively connected electrically to plates 76, 77, 78, 79 and 80 at locations 81, 82, 83 and 84, respectively, and are resiliently biased toward the slip ring 74 to contact therewith. The locations 81, 82, 83 and 84 correspond respectively with the positions of radial holes 30, 31, 32 and 33 in the tubular member 26 in the hydraulic damper. The Geneva wheel 57 is rigidly connected to the shutter 29 in the hydraulic damper through the rod 24 and the location of the cutout 73 corresponds with the cutout 34 in the shutter 29.

Figure 2:
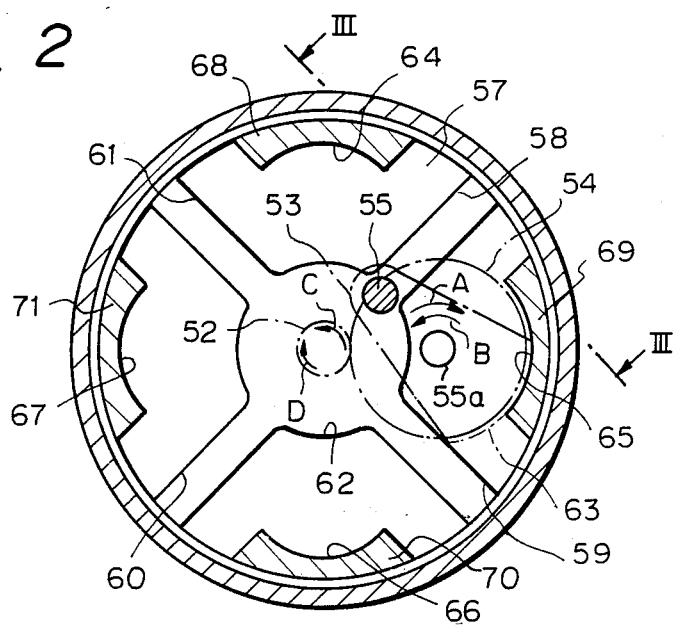
FIG. 2 is a sectional view taken along line II—II in FIG. 1.
Figure 3:
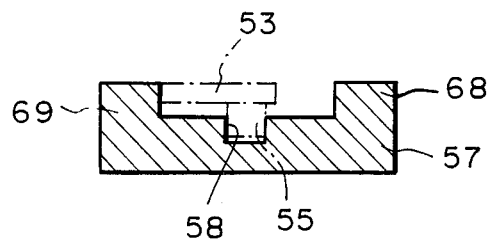
FIG. 3 is a sectional view taken along line III—III in FIG. 2.

In FIG. 2, when the pin wheel 53 rotates in the direction of arrow A the driving pin 55 engages with the groove 58 and the Geneva wheel 57 is rotated in the direction of arrow D by 90 degrees with the driving pin 55 reciprocatingly moving in the groove 58 and finally escaping out of the groove 58 to enter the central recess 62. Thereafter, when the pin wheel 53 further rotates in the direction of arrow A the driving pin 55 engages with the groove 61 and rotates the Geneva wheel further in the direction of arrow D.

Figure 5:
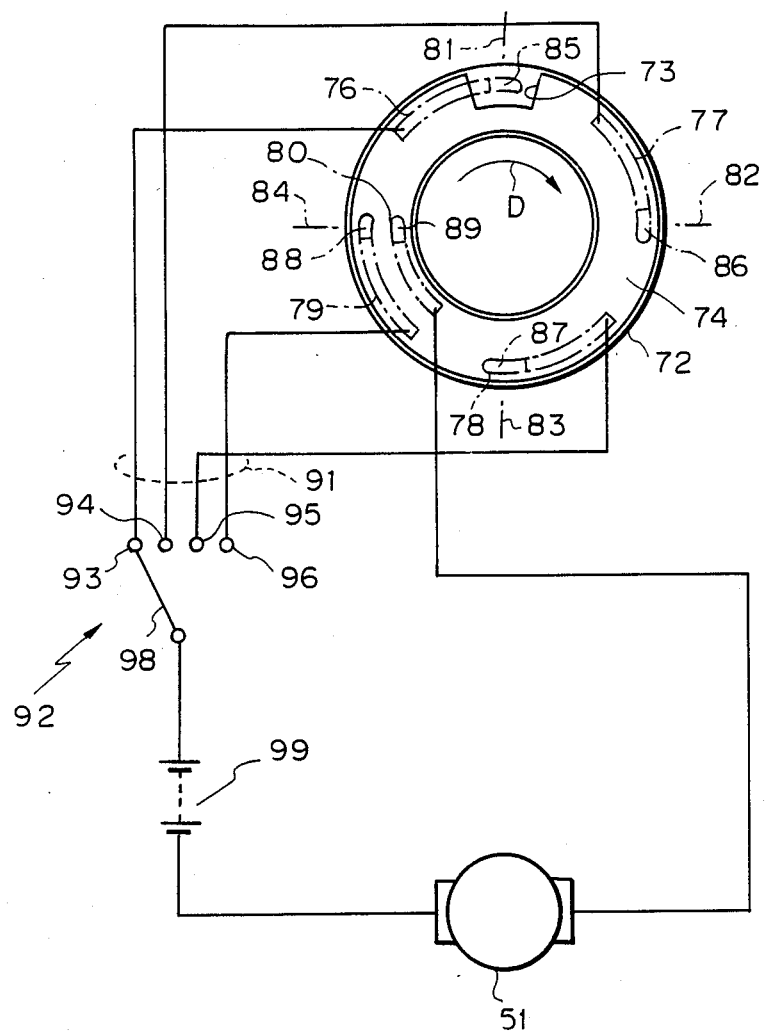
FIG. 5 is a diagram of control circuit for the rotary actuator of FIG. 1.

When the Geneva wheel 57 is rotated to locate the cutout 73 in the slip ring 74 at positions 81, 82, 83 and 84 respectively, respective brushes 85, 86, 87 and 88 do not contact with the slip ring 74, while, the brush 89 permanently contacts the slip ring 74. The plates 76, 77, 78, 79 and 80 are respectively connected to contact points 93, 94, 95 and 96 of a switch 92 and to one of terminals of the motor 51 through cables 91 (only one of which is shown in FIG. 1). The switch 92 is, for example, mounted on an operating panel in the driver's compartment of a vehicle on which the hydraulic damper is installed. A movable contact point 98 of the switch 92 is connected to one of the terminals of D.C. electric source 99, and the other terminal of the electric source 99 is connected to the other terminal of the motor 51, as shown in FIG. 5.

In operation, when the movable contact point 98 of the switch 92 contacts with the contact point 93 and the cutout 73 is located at position 81, then, the brush 85 is separated from the slip ring 74, and no electric current is supplied to the motor 51, and, the pinion 52, gear 54, pin wheel 53, Geneva wheel 57, rod 24 and shutter 29 do not move, with the cutout 34 in the shutter 29 aligning with the radial hole 31. The chambers 13 and 14 are communicated through the radial hole 25, bore 23 in the piston rod 7, holes 36 and cutout 34 in the shutter 29, and the radial hole 31. The hydraulic damper generates a damping force in the extension stroke or the movement of the piston 12 in the direction of arrow G as defined by the fixed orifice in the piston 12, the radial hole 31 and the disc valve 16. The diameter of the hole 31 is larger than the hole 30 and is smaller than the holes 32 and 33, thus the damping force is the second hardest. Similarly, the damping force in the contraction stroke is also the second hardest.

When the switch 92 is actuated to contact the movable contact 98 with the contact point 94, the electric current flows to the motor 51 through the conductor plate 77, brush 86, slip ring 74, the brush 89 and the conductor plate 80, and, the motor 51 rotates the pinion 52 in the direction of arrow C, the gear 54 and the pin wheel 53 the direction of arrow A. The pin 55 enters into the groove 58 with the Geneva wheel 57 being rotated in the direction of arrow D, until the pin 55 escapes out of the groove 58 with the Geneva wheel 57 having been turned by 90 degrees. The cutout 73 is located at the position 82 with the brush 86 being separated from the slip ring 74, and the motor 51 stops. The cutout 34 in the shutter 29 aligns with the radial hole 32. Thus, the hydraulic damper generates, both in the extension and contraction strokes, damping forces of the third hardest or the second softest.

The shutter 29 is rotated similarly in response to the further operation of the switch 92. For example, when the movable contact 98 of the switch 92 is displaced from the contact 94 to the contact 96, the Geneva wheel 57 is rotated in the direction D by 180 degrees and the cutout 34 of the shutter 29 is displaced from the position facing the hole 32 to the position facing the hole 30.

In the rotary actuator 39, the central recess 62 is formed in the Geneva wheel 57 such that when the pin 55 of the pin wheel 53 escapes out of any of radial grooves 58, 59, 60 and 61 and enters into the central recess 62, no motion is transmitted between the pin wheel 53 and the Geneva wheel 57, and even though the pin wheel 53 is rotated by a small amount the Geneva wheel does not rotate, whereby cutout 34 of the shutter 29 can be rotated to the desired rotational position facing any of radial holes 30, 31, 32 and 33. Further, when the pin 55 is located in the central recess 62, the arcuate wall 63 of the pin wheel 53 is located closely adjacent to one of arcuate walls 64, 65, 66 and 67 of projections 68, 69, 70 and 71 respectively, and, rotation of the Geneva wheel 57 with respect to the pin wheel 53 is prevented by the engagement of the arcuate wall 63 and one of arcuate walls 64, 65, 66 and 67, so that, the shutter 29 is reliably held at the desired rotational position. Further, the slip ring 74 having the cutout 73 is provided on the Geneva wheel 57 and brushes 85, 86, 87, 88 and 89 for contacting with the slip ring 74 are provided on the casing 40, and the slip ring 74, the brushes 85, 86, 87 and 88, and the motor 51 are connected in series with respect to the electric source 99, so that, it is possible to simplify the control circuit of the motor 51, and the motor 51 can be controlled easily in response to the operation of the switch 92.

In the embodiment, the slip ring 74 is mounted on the Geneva wheel 57, and brushes 85, 86, 87, 88 and 89 are mounted on the casing 40, However, the invention is not limited to this embodiment. Further the invention may be applied to various kinds of rotary driving mechanisms.

According to the invention, the angular positions of a rotating mechanism can be set reliably and easily, and the control circuit therefor can be simplified, so that, it is possible to reduce substantially the costs.

What is claimed is:

1. A rotary actuator comprising:
    a first rotor having in one end surface thereof a central recess and a plurality of grooves extending radially outwardly from said central recess, said first rotor being rotatably around a first axis which extends perpendicularly to said one end surface;
    a second rotor rotatable around a second axis which is parallel to and spaced from said first axis, said second rotor having a projection thereon selectively engagable with said central recess and said grooves, whereby rotation is transmitted from said second rotor to said first rotor when said projection engages with one of said grooves and is not transmitted from said second rotor to said first rotor when said projection is located in said central recess;
    an electrically powered driving mechanism connected with said second rotor to rotate said second rotor around said second axis;
    a slip member of electrically conductive material having an electrically non-conductive portion thereon and being mounted on the other end surface of said first rotor;
    a plurality of brushes circumferentially aligned in the rotational direction of said slip member and in contact with said slip member along an annular path which passes through said non-conductive portion; and
    an electric circuit means connected to said driving mechanism and including said brushes for, when a selected one of said brushes is out of contact with said non-conductive portion, closing said circuit means to drive said driving mechanism, and when a selected one of said brushes is in contact with said non-conductive portion, breaking said circuit means for stopping said driving mechanism.

2. A rotary actuator as claimed in claim 1 in which said first rotor is a Geneva wheel.

3. A rotary actuator as claimed in claim 1 in which said second rotor has a circumferential wall portion in the shape of an arcuate wall, and a plurality of correspondingly shaped arcuate walls spaced around said first rotor and cooperating with the arcuate wall on said second rotor when said projection engages in the central recess for preventing rotation of said first rotor relative to the second rotor.

4. A rotary actuator as claimed in claim 1 in which said non-conductive portion is a cutout in said slip member.

* * * * *